Aug. 11, 1936.  C. W. HOWARD  2,050,327
AIRCRAFT WING
Filed May 2, 1935　　2 Sheets-Sheet 1
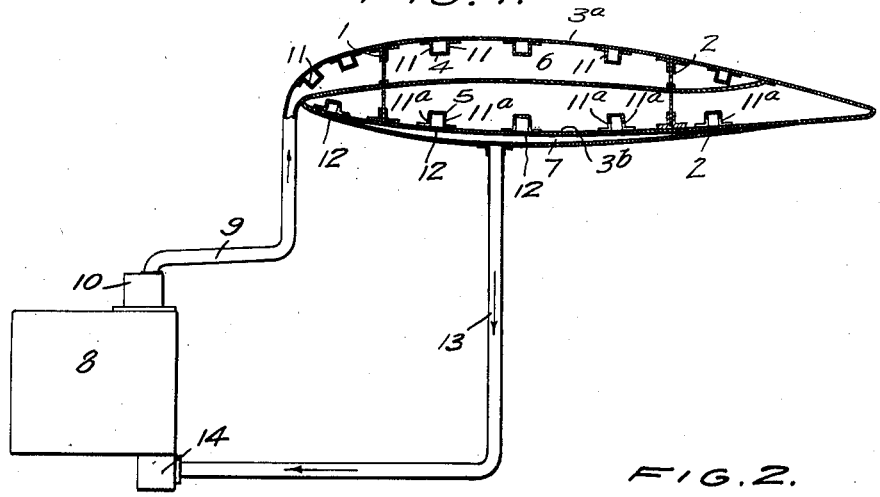
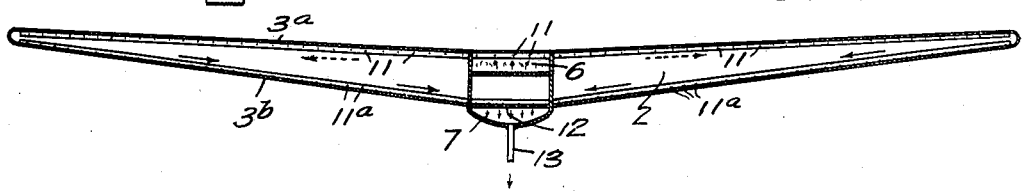
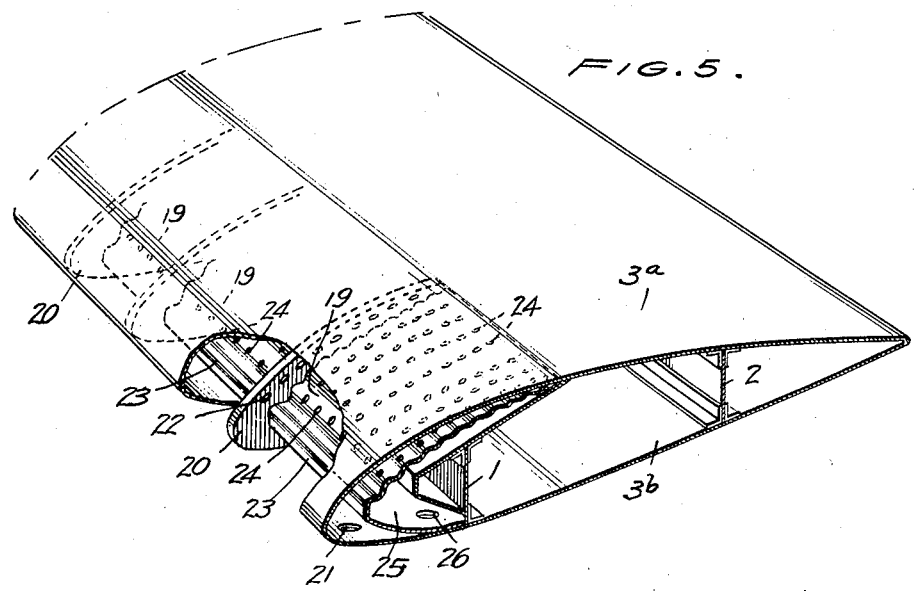
INVENTOR
CLINTON W. HOWARD
BY
ATTORNEYS Aug. 11, 1936.  C. W. HOWARD  2,050,327
AIRCRAFT WING
Filed May 2, 1935   2 Sheets-Sheet 2
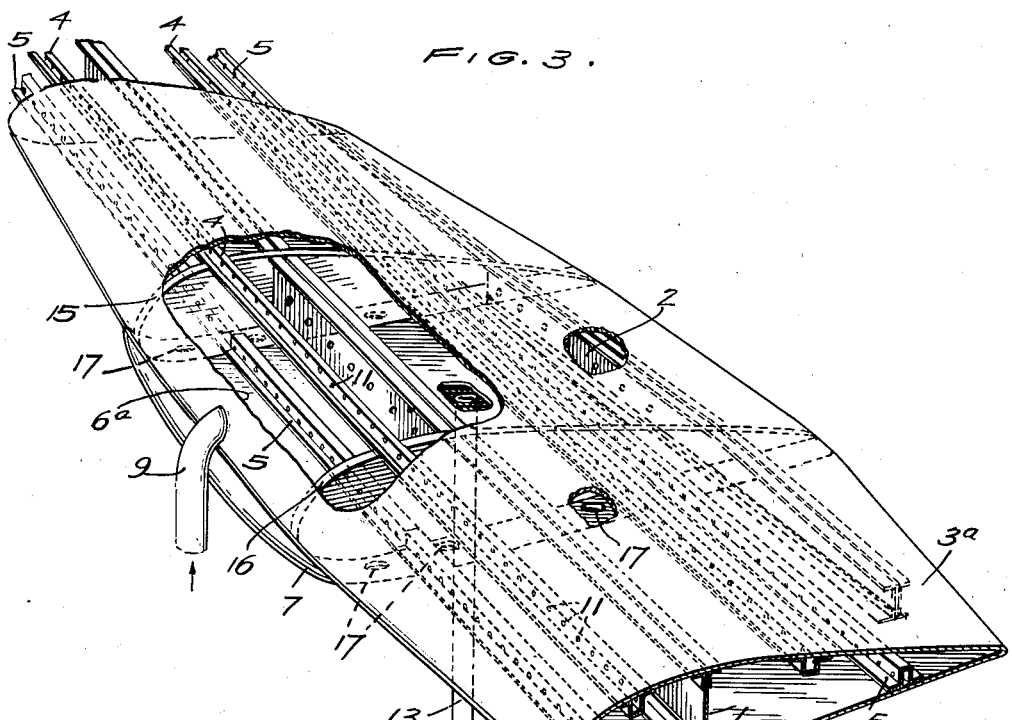
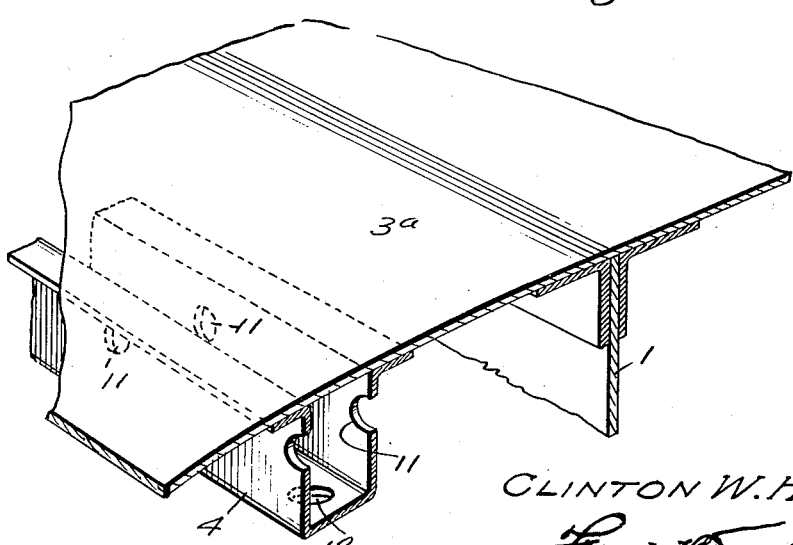
INVENTOR
CLINTON W. HOWARD
BY
ATTORNEYS Patented Aug. 11, 1936

2,050,327

UNITED STATES PATENT OFFICE 2,050,327

AIRCRAFT WING

Clinton W. Howard, Washington, D. C.

Application May 2, 1935, Serial No. 19,430

5 Claims. (Cl. 244—31)

(Granted under the act of March 3, 1883, as amended April 30, 1928; 370 O. G. 757)

The invention described herein may be manufactured and used by or for the Government for governmental purposes, without the payment to me of any royalty thereon.

This invention relates generally to an engine-cooling system for a liquid-cooled engine of the type employed in air craft and is directed chiefly to an improved airplane wing structure designed to be used as a unit of the cooling system.

In the normal airplane equipped with liquid-cooled engines, it is necessary to cool the heated water as it leaves the engine cylinders by providing suitable apparatus such as a radiator. The radiator is usually made of copper and brass and is soldered to prevent leakage, is heavy, and by reason of its necessary location in the slip stream presents considerable resistance to the airflow and detracts greatly from the performance of the airplane.

The elimination of the radiator resistance makes for a considerable increase in performance of the airplane and, therefore, an important object and feature of the present invention is the elimination of the radiator, with its attendant weight and head-resistance, as a separate article of airplane equipment and the utilization of the supporting wing of the airplane as a radiator equivalent without in any way increasing the head resistance of the wing and with only a slight increase in weight.

With the foregoing in view, the invention provides primarily for the novel use of the structural elements of a metallic airplane wing, particularly the stringers or reinforcing members for the metal covering of the wing and which extend along the span of the wing, as a means for distributing the heated water, steam or other vapor from the engine-cylinder jacket over the large area of the wing covering for rapid dissipation of the heat.

In addition to providing for the use of the wing reinforcements to convey and distribute the heated engine-cooling liquid to and over any desired portion of the wing stem, the invention also provides for the use of welded steel in a radiator-type wing to prevent corrosion and to give high strength.

A further object of the invention is to provide a novel airplane wing structure characterized by the disposal of a specially constructed cooling apparatus or radiator equivalent along the leading portion of the wing and so attached to the wing that it contributes structural strength thereto.

These objects and advantages are obtained by the novel arrangement, construction and combination of elements hereinafter fully described and pointed out in detail, with reference to the accompanying drawings, wherein:

Figure 1 is a diagrammatic view of an airplane engine water-cooling system including as a unit thereof a metal wing structure as modified in accordance with the invention.

Figure 2 is a vertical, longitudinal central section of the modified wing structure shown in Figure 1;

Figure 3 is a perspective view of a portion of a metal wing with parts broken away to disclose the structural modification thereof which are somewhat different from the wing structure shown in Figure 1.

Figure 4 is a detail view, on an enlarged scale, of the wing covering and wing-covering reinforcing members and showing the arrangement and location of the water or vapor outlet orifices of the stringers.

Figure 5 is a view of a wing structure modified to show another and different form or application of the invention.

The wing structure shown in the several views of the drawings may be built of sheet metal of duralumin or steel, or both. The front and rear metal wing spars are indicated at 1 and 2, respectively and the metal wing covering at 3a and 3b. Stringers or reinforcing members 4 and 5, of channel section, extend along the span of the wing internally thereof and are secured to the upper metal covering 3a and the lower metal covering 3b in the manner shown.

One method of adapting such a wing structure for the purpose and objects of the present invention is shown in Figures 1 and 2. Near the center of the wing and in a transverse plane are disposed two headers or feeders 6 and 7, the former being internally of the wing and adjacent the upper wing covering 3a, while the latter is externally of the bottom wing covering 3b. The heated water or vapor from the aircraft engine 8 is conducted under pressure to the header 6 at the upper nose portion of the wing through a pipe or tubing 9 which is preferably equipped with a pressure regulating device 10 for controlling the pressure at which the heated engine-cooling medium is discharged into the header 6. From the header 6, the hot vapor or liquid passes into the upper channels 4 through openings 11 in the central portions of the channels and then along the channels for the full span of the wing. Through additional openings 11 in the outer portions of the channels, the heated vapor or liquid is discharged into the wing and against the wing covering 3a for quick condensation and cooling, the condensed vapor or cooled liquid collecting upon the bottom wing covering 3b and passing into the lower channels 5 through openings 11a. Due to the dihedral of the wing or the slope of the bottom wing covering, the cooled liquid drains along the lower channels to the center of the wing and passes through drain openings 12 into the bottom header 7. From the bottom header 7, the cooled liquid is drawn off through a pipe or tubing 13 by a pump 14 through which it passes into the engine water jacket. The flow is as indicated by arrows in pipes 9 and 13. The wing spars 1 and 2 are perforated to permit passage of the heated cooling medium therethrough.

In the modification shown in Figure 3, the heated liquid or vapor from the engine is conducted by pipe 9 to a compartment 6a at or near the center of the wing. This compartment is enclosed by the upper metal wing covering 3a and lower metal wing covering 3b and two solid bulkheads 15 and 16 extending between covering 3a and 3b from the nose to the trailing edge of the wing. From compartment 6a, the heated vapor passes into the stringers or reinforcing members 4 and 5 on coverings 3a and 3b, respectively, through the openings 11 and 11a spaced apart longitudinally of the members 4 and 5 as illustrated. As the vapor passes through the stringers toward the wing tips, due to a pressure potential in compartment 6a, it is discharged into the wing and against the wing covering through such openings 11 and 11a of members 4 and 5, as are outside of the compartment. The condensed vapor, in the form of a liquid, collects on the inner side of covering 3b and flows, on account of the dihedral of the wing or slope of the wing covering, towards bulkheads 15 and 16 where it drains into the header 7 through openings 17 in covering 3b just outboard of bulkheads 15 and 16. From header 7, the cooled liquid is drawn off, as in Figure 1, through a pump lead or tubing 13.

In connection with the metal wing structures shown in Figures 1 to 4 inclusive, it may be desirable to locate the holes or openings 11 in members 4 near wing covering 3a, as shown in Figure 4, so that the discharged vapor will be near the covering 3a for quick heat dissipation. Holes or openings 11a in members 5 may have the same location with respect to wing covering 3b for the same reason. It may also be desirable to have an occasional hole 18 in the upper members 4 for drainage of any condensate in members 4. It is desirable, also, that the condensate from each side of the wing be separated, as by the bulkheads 15 and 16, and that it collect in a common reservoir or head 7 to always insure a return flow of condensate through pipe 13 for engine cooling in any tilted position of the wing.

Figure 5 shows a modified metal wing structure in which only the leading portion is designed to function as a cooler. The nose of the wing, which includes the portion ahead of the front wing spar 1 and a portion above and aft of the front spar may be integral with or detachable from the wing yet it is solidly fastened to it that it may be considered a part of the wing structure, giving strength thereto. The nose portion is partitioned off into a series of compartments 19 by laterally spaced partitions or ribs 20, the central most compartment of which is provided in the bottom covering thereof with an inlet opening 21 for the heated liquid or vapor from the engine. The vapor passes from the central compartment to the wing tips through the perforations 22 in the compartment partitions 20, the condensed vapor or cooled liquid in each compartment descending upon the stepped baffle 23 and draining through the perforations 24 in the baffle to the space below. The condensate from the compartments collects in the bottom space 25 of the central compartment and is drawn off through the exit opening 26 for recirculation in the engine water jacket.

From the foregoing description, it will be seen that the invention provides a novel vapor condensing or liquid cooling wing of metal construction in which the reinforcements under the metallic skin are so disposed and arranged as to serve to distribute over a wide area of air-cooled surface, the heated liquid or vapor from the engine water jacket and to collect and return same to the engine-jacket after it has been cooled or condensed.

Having thus described the invention, what is claimed as new is:—

1. A wing structure comprising a wing covering, an internal chamber for receiving a heated fluid, channel members secured to and reinforcing the upper portion of the wing covering internally of the wing structure and having fluid ports in communication with said chamber for receiving the heated fluid thereof and distributing same over the upper wing covering for condensation and cooling, channel members secured to and reinforcing the bottom portion of the wing covering, said bottom reinforcing channel members having fluid ports open to the bottom wing covering for receiving the condensate collecting on said bottom covering, and an external chamber in communication with the bottom channel members for receiving the condensate therefrom.

2. A wing structure having, in combination, a wing covering, reinforcing members secured to the wing covering internally of the wing structure and extending along the upper and lower portion of the wing covering for the span of the wing, each of said reinforcing members being of channel section to serve as a conduit for a heated fluid and being apertured to discharge the heated fluid against the wing covering for condensation and cooling of the medium, a fluid-receiving chamber within said wing structure and in communication with the said reinforcing channel members for supplying the heated fluid thereto, a condensate collecting chamber externally of and at the center of the bottom covering of the wing, said wing structure having a dihedral or slope to cause the condensate to drain into said condensate collecting chamber.

3. A wing structure having a compartment at or near the center of the wing enclosed by the upper wing covering and the lower wing covering and two solid bulkheads extending between the upper and lower wing coverings, said compartment being adapted to receive the heated cooling liquid from an engine cylinder, internal reinforcing members for the upper and lower wing coverings comprising stringers of channel section on the said coverings and extending for the span of the wing, each of said channel stringers being provided throughout its length with spaced openings, the central most openings being in communication with the said wing compartment to permit the heated medium of the compartment to pass into the stringer for conduction toward the wing tips and the outer most openings serving to discharge the heated medium into the wing and against the wing covering for quick condensation and cooling of the said heated medium, drain outlets for the said condensate located in the bottom wing covering just outboard of the said bulkheads, and a condensate collecting chamber externally of the bottom wing covering and below said drain outlets.

4. An aircraft wing comprising a metal cover shaped to form a stream-line body, inlet and outlet headers for fluid to be cooled enclosed by said cover and arranged one above the other at the mid section of the wing, said headers jointly extending from top to bottom and individually extending from front to rear of the mid-section of said streamline body, and fluid ducts extending longitudinally of the upper inner faces of the metal cover in opposite directions from the inlet header and having discharge ports through which the heated fluid of the inlet header is discharged against the metal cover of the outer sections of the wing for quick condensation and cooling, said cover having drain openings in the mid-section of its bottom portion through which the condensate or cooled fluid of the outer sections of the wing drains into the outlet header.

5. An aircraft wing having a compartment in its mid-section for receiving a heated liquid or vapor, hollow stringers contiguous to and reinforcing the wing covering internally of the wing, said hollow stringers extending through the said mid-section compartment and being perforated to serve as conduits for receiving and distributing the heated liquid or vapor of the said compartment over the wing covering, and a condensate collecting chamber at—and immediately contiguous to the lower surface of—the mid-section of the wing and having communication with the interior of the wing through drain openings in contiguous portions of the collecting chamber and wing.

CLINTON W. HOWARD.